United States Patent [19]
Hatoh et al.

[11] Patent Number: 4,997,729
[45] Date of Patent: Mar. 5, 1991

[54] ANODE FOR HIGH TEMPERATURE FUEL CELL

[75] Inventors: Kazuhito Hatoh, Neyagawa; Junji Niikura, Katano; Hisaaki Gyoten, Hirakata; Noboru Taniguchi, Osaka; Takaharu Gamo, Fujiidera; Yoshio Moriwaki, Hirakata; Tsutomu Iwaki, Yawata, all of Japan

[73] Assignee: Matsushita Electric Industrial Co., Ltd., Osaka, Japan

[21] Appl. No.: 290,189

[22] Filed: Dec. 27, 1988

[30] Foreign Application Priority Data

Dec. 24, 1987 [JP] Japan .................. 62-328545
Aug. 30, 1988 [JP] Japan .................. 63-215447

[51] Int. Cl.$^5$ ............................. H07M 4/90
[52] U.S. Cl. ........................ 429/40; 429/59; 420/900
[58] Field of Search .............. 429/16, 57, 59, 40; 420/900; 428/661, 667, 668, 687

[56] References Cited

U.S. PATENT DOCUMENTS 4,216,274 8/1980 Bruning et al. .................. 429/57
4,668,424 5/1987 Sandrock ...................... 420/900 X
4,833,046 5/1989 Roy ............................. 429/16 X Primary Examiner—Stephen J. Kalafut
Attorney, Agent, or Firm—Wenderoth, Lind & Ponack

[57] ABSTRACT

An anode for high temperature fuel cell containing metal hydrides or hydrogen absorbing alloys at least in part of the anode material of high temperature fuel cell operating while consuming a gas containing hydrogen, or a gas substantially containing hydrogen, as the fuel. In particular, at least in part of the anode for molten carbonate fuel cell, either metal hydrides or hydrogen absorbing alloys is used, and the performance of the anode is enhanced, and it contributes to extension of the life of the anode.

11 Claims, 5 Drawing Sheets

ANODE FOR HIGH TEMPERATURE FUEL CELL

BACKGROUND OF THE INVENTION

This invention relates to an anode for a high temperature fuel cell using hydrogen absorbing alloys or metal hydrides at least in part, or more particularly to an anode for a molten carbonate fuel cell, which is utilized in a co-generating system of low pollution and high efficiency.

In the conventional anode for a high temperature fuel cell, nickel or nickel alloy has been used in consideration of the cost, oxidation catalytic ability of hydrogen which is used as fuel, electron conductivity, and high temperature stability in reducing atmosphere.

The problems to be solved relating to such anodes for a high temperature fuel cell, especially anodes for a molten carbonate type fuel cell may be summarized into reduction of function due to decrease of the porosity and specific surface area of the anode by oversintering of the nickel which is the principal constituent material in the course of time during operation of the cell at high temperature. Since the anode is a porous gas diffusion electrode, the area of the active portion contributing to the electrode reaction is closely related with to the porosity and specific surface area of the electrode. Therefore, the oversintering of the porous anode gives rise to drop of cell performance, and also dominates the cell life, and hence it is a serious problem.

To solve the above problems, in the conventional anode for a high temperature fuel cell, nickel alloys or their mixtures with ceramics or electrolyte have been used. In particular, in the case of molten carbonate fuel cell, ceramics have been added to nickel-chromium alloy, nickel-aluminum alloy or nickel. These alloys, however, involve other problems, such as corrosion of chromium or other element in the alloy, lowering of electron conductivity or difficulty in forming the anode due to increase of content of chromium or aluminum contained in the above, or failure in prevention of oversintering if the content of chromium or aluminum is too low. Concerning the oxidation catalytic ability of hydrogen, besides, when chromium, aluminum or other is added to the nickel in order to prevent oversintering, the nickel's own catalytic ability for hydrogen oxidation is lowered.

SUMMARY OF THE INVENTION

It is hence a primary object of this invention to present an anode for high temperature fuel cell capable of enhancing the cell performance and extending the cell life, by using metal hydrides or hydrogen absorbing alloys at least in part, especially in the anode for a molten carbonate fuel cell.

In this invention, the metal hydrides or hydrogen absorbing alloys are used at least in a part of the anode for a high temperature fuel cell. Especially the anode of the molten carbonate fuel cell may be a metal possessing the capability of becoming a hydrogen absorbing alloy or metal hydride at ordinary temperature, while not absorbing hydrogen at a high temperature which is the operating temperature of the cell, and transmitting hydrogen, (for example, Ti-Ni alloy systems, La-Ni alloy systems, Ti-Mn alloy systems). Further a metal hydride or hydrogen absorbed alloy containing zirconium may be employed as a component (for example, Zr-Ni alloy systems, Zr-Cu alloy systems), or a metal hydride or hydrogen absorbed alloy containing lanthanide elements may be employed as a component (for example, La-Ni alloy systems, Mm-Ni alloy systems), Mm (mischmetal) expresses the mixture of lanthanide elements, or a eutectic crystal containing at least one element contained in hydrogen absorbing alloys or metal hydrides as well as hydrogen absorbing alloys or metal hydrides (for example, eutectic crystal of Ti-Ni alloy systems and Ni, eutectic crystal of La-Ni alloy systems and Ni, eutectic crystal of Zr-Ni alloy systems and Ni, eutectic crystal of Zr-Cu alloy systems and Cu may be employed).

While the novel features of the invention are set forth in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
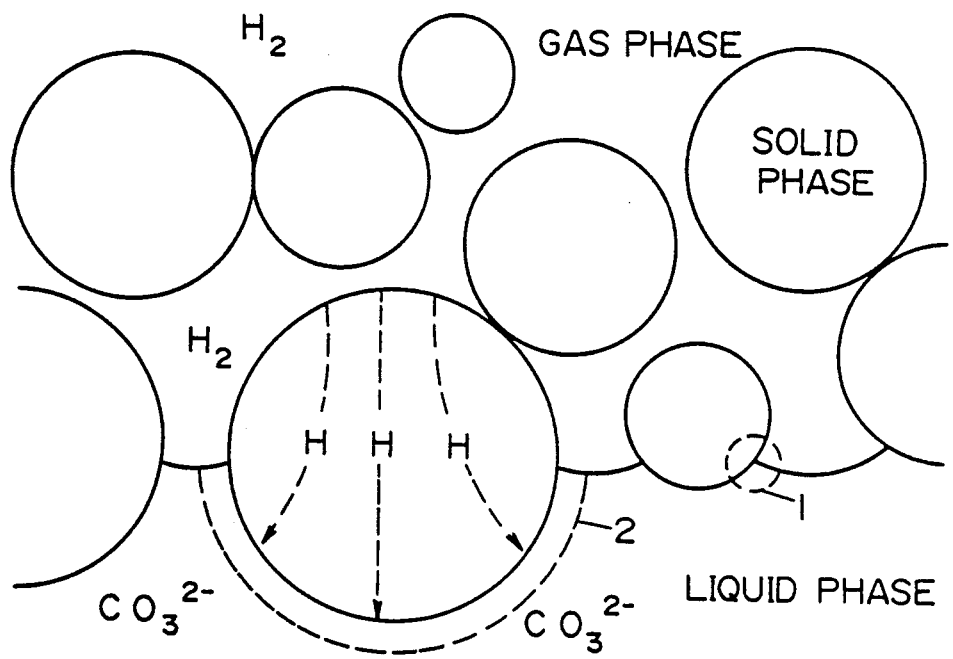
FIG. 1 shows the electrode active portion (resembling a two-phase zone) when a metal having a possibility of becoming hydrogen absorbing alloy or metal hydrides at an ordinary temperature, and not absorbing hydrogen and passing hydrogen at a high temperature which is the operating temperature of a cell according to this invention is used as the anode for a high temperature fuel cell, especially the anode for a molten carbonate fuel cell, and a three-phase zone when an ordinary nickel alloy is used.

The invention is described below while referring to the drawings. In the drawings, numeral 1 denotes a three-phase zone, 2 is an electrode active portion (resembling a two-phase zone) according to this invention, 3 shows the cell performance when the hydrogen absorbing metal or metal hydrides of this invention is used at least in part for the anode for the high temperature fuel cell, especially the anode for the molten carbonate fuel cell, and 4 represents the cell performance when an ordinary nickel anode is used.

The oxidation reaction of hydrogen on an ordinary nickel alloy anode in a high temperature fuel cell, especially molten carbonate fuel cell is generally considered to take place in the three-phase zone where the solid phase (electrode), liquid phase (electrolyte), and vapor phase (fuel) converge. Strictly speaking, however, the three-phase contacting part is one-dimensional and there should be no area. Actually, therefore, it is considered that an electrochemical oxidation reaction of hydrogen occurs near the three-phase zone, but anyway the area contributing to this reaction is limited. Therefore, in order to maintain a high performance of the high temperature cell, especially a molten carbonate fuel cell, it is necessary to keep this reaction responsible area as wide as possible, that is, it is needed to keep the porosity and specific surface area of the anode at a high level.

Of the metal hydrides or hydrogen absorbing alloys used at least in part of the anode for high temperature fuel cell, especially the anode for molten carbonate fuel cell of this invention, a metal becoming a hydrogen absorbing alloy or metal hydride at ordinary temperature, and not absorbing hydrogen and passing hydrogen at high temperature which is the operating temperature of the cell (for example, Ti-Ni alloy, systems, La-Ni alloy systems, Ti-Mn alloy systems) diffuses an atomic or molecular hydrogen in the solid phase composing the anode, in the cell operating condition as shown in FIG. 1, until reaching the contacting part of solid phase (electrode) and liquid phase (electrolyte), and immediately reacts with carbonate ions or oxygen ions in the liquid phase. That is, in addition to the three-phase zone in which the electrochemical reaction was conventionally considered to take place, the electrochemical reaction also occurs in the portion where the solid phase and vapor phase are united and contact the liquid phase (that is, in an area resembling a two-phase zone where the solid phase and liquid phase contact with each other), and therefore the active portion area necessary for this reaction is larger as compared with the conventional nickel alloy anode having the same porosity and specific surface area, which contributes to enhancement of the cell performance. Meanwhile, a metal having a possibility of becoming a metal hydride or hydrogen absorbing alloy containing zirconium as a component (for example, Zr-Ni alloy systems, Zr-Cu alloy systems) possesses a hydrogen equilibrium pressure at high temperature, and it is possible to absorb and desorb hydrogen in the operating condition of the high temperature fuel cell, and the catalytic activity to hydrogen oxidation is high, which also contributes to the enhancement of the cell performance.

However, when used in the anode for a high temperature fuel cell, especially the anode for a molten carbonate fuel cell, the atmosphere of the electrolyte or the like directly contacting with the anode may be a corrosive atmosphere for the metal having a possibility of becoming hydrogen absorbing alloys or metal hydrides. In such a case, it has been discovered that the corrosion resistance may be improved by using a eutectic crystal containing at least one element contained in hydrogen absorbing alloys or metal hydrides together with hydrogen absorbing alloys or metal hydrides.

All the foregoing metals having a possibility of becoming metal hydrides or hydrogen absorbing metal can prevent oversintering of the anode due to pulverization by passing, absorption and desorption of hydrogen, and the metals having a possibility of becoming metal hydrides or hydrogen absorbing alloys are hard to be sintered as compared with the conventional nickel anode materials, and therefore by using such metals by mixing into the conventional anode materials of nickel alloy powder or the like, it has been disclosed that the difficulty in sintering of the metals having a possibility of becoming metal hydrides or hydrogen absorbing alloys brings about, to the contrary, an effective action to prevent oversintering.

Thus, the invention is intended to enhance the performance of the anode, contributing to extension of the life of the anode. Preferred embodiments of the invention ar described below.

(Embodiment 1)

Of the metal hydrides or hydrogen absorbing alloys, as the metal having a possibility of becoming hydrogen absorbing alloys or metal hydrides at ordinary temperature, and not absorbing hydrogen but passing hydrogen at a high temperature which is the operating temperature of the cell, a titanium-nickel alloy was used. It may be used directly, but in this embodiment, its powder (20 $\mu$m or less) and carbonyl-nickel powder were mixed at a ratio of 50:50 wt.%, and this mixture was sintered in a reducing atmosphere furnace at 800° C., and an anode was formed.

As the cathode, lithium-doped porous nickel oxide was used, and the electrolyte was prepared by forming the mixture of lithium carbonate and potassium carbonate at a ratio of 62:38 mol%, together with lithium aluminate which is an electrolyte support material, by the tape casting method. As the fuel gas, a mixture of hydrogen, carbon dioxide and steam at a ratio of 72:18:10 vol% was used, together with an oxidizer composed of air and carbon dioxide at a ratio of 70:30 vol%, and the molten carbonate fuel cell was tested at a temperature of 650° C.

Figure 2:
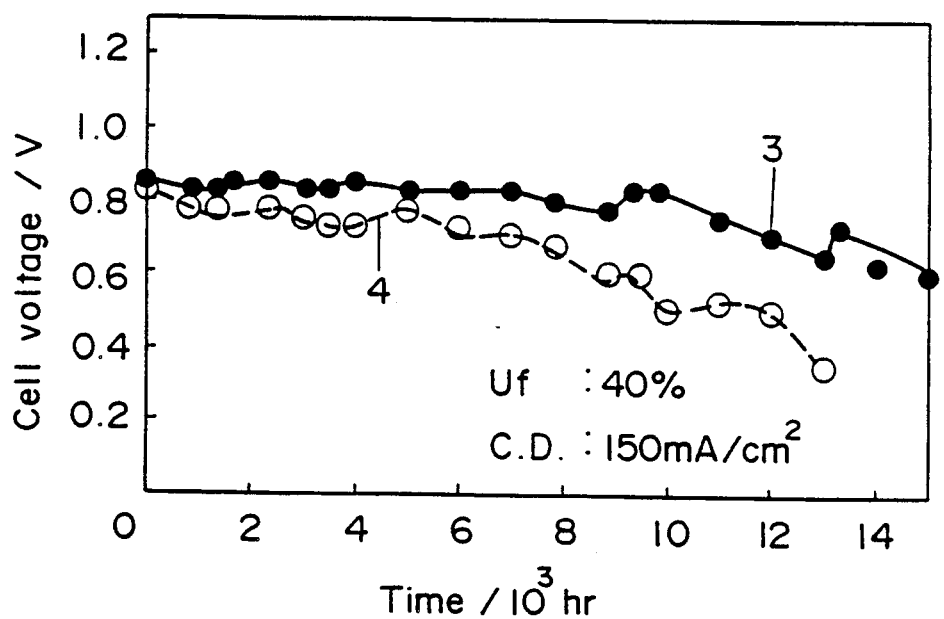
FIG. 2 to FIG. 10 comparatively show the relation between the performance and time, when the hydrogen absorbing alloy or metal hydrides of the invention are used at least in part of the anode for high temperature fuel cell, especially the anode for molten carbonate fuel cell, and when an ordinary nickel anode is used.

FIG. 2 shows the relation between the time and performance compared in the same condition between the cell having the metal hydrides or hydrogen absorbing alloys mixed to the anode, and the cell using an ordinary nickel anode. Obviously, when the metal hydrides or hydrogen absorbing alloys were mixed to form the anode, a high performance was maintained for a long period, and the effectiveness was confirmed.

(Embodiment 2)

Of the metal hydrides or hydrogen absorbing alloys, as the metal having a possibility of becoming hydrogen absorbing alloys or metal hydrides at ordinary temperature, and not absorbing hydrogen but passing hydrogen at a high temperature which is the operating temperature of the cell, a lanthanum-nickel alloy was used. It may be used directly, but in this embodiment its powder (20 $\mu$m or less) was mixed with carbonyl-nickel powder at a ratio of 50:50 wt.%, and the mixture was sintered in a reducing atmosphere furnace at 850° C., and an anode was formed.

As the cathode, a lithium-doped porous nickel oxide was used, and the electrolyte was prepared by forming a mixture of lithium carbonate and potassium carbonate at 62:38 mol%, together with lithium aluminate which is an electrolyte retaining material, by the tape casting method. As the fuel gas, a mixture of hydrogen, carbon dioxide and steam at a ratio of 72:18:10 vol% was used, together with an oxidizer composed of air and carbon dioxide at a ratio of 70:30 vol%. The molten carbonate fuel cell was tested at a temperature of 650° C.

Figure 3:
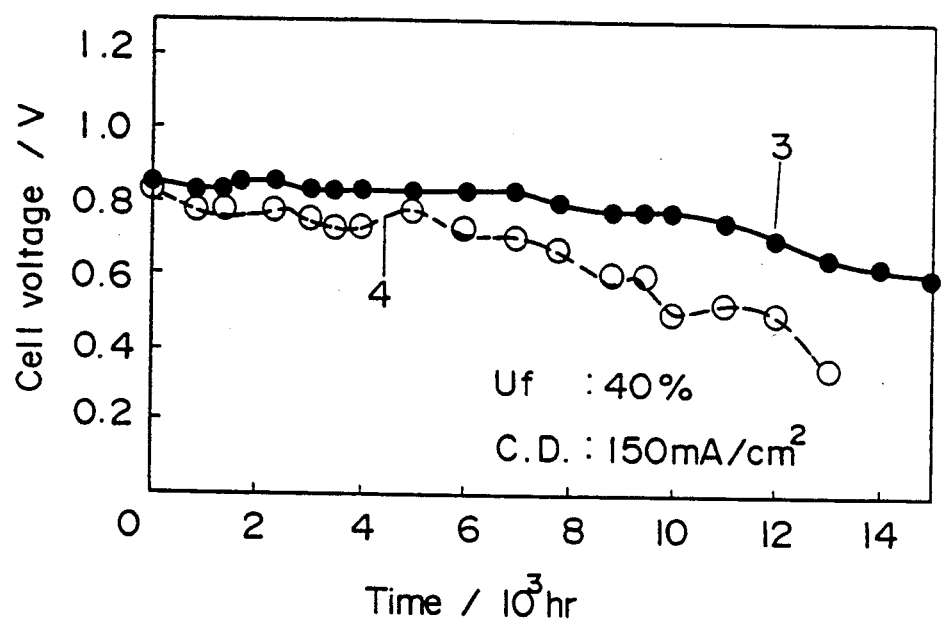

FIG. 3 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys were mixed to the anode, a high performance was maintained for a long period, and the effectiveness was confirmed.

(Embodiment 3)

Of the metal hydrides or hydrogen absorbing alloys, as the metal having a possibility of becoming hydrogen absorbing alloys or metal hydrides at ordinary temperature, and not absorbing hydrogen but passing hydrogen at a high temperature which is the operating temperature of the cell, a titanium-manganese alloy was used. It may be used directly, but in this embodiment its powder (15 $\mu$m or less) was electroless plated with nickel for improving the corrosion resistance, and it was sintered in a hydrogen atmosphere furnace at 700° C., and an anode was formed.

As the cathode, a lithium-doped porous nickel oxide was used, and the electrolyte was prepared by forming a mixture of lithium carbonate and potassium carbonate at 62:38 mol%, together with lithium aluminate which is an electrolyte retaining material, by the tape casting method. As the fuel gas, a mixture of hydrogen, carbon dioxide and steam at a ratio of 72:18:10 vol% was used, together with an oxidizer composed of air and carbon dioxide at a ratio of 70:30 vol%. The molten carbonate fuel cell was tested at a temperature of 650° C.

Figure 4:
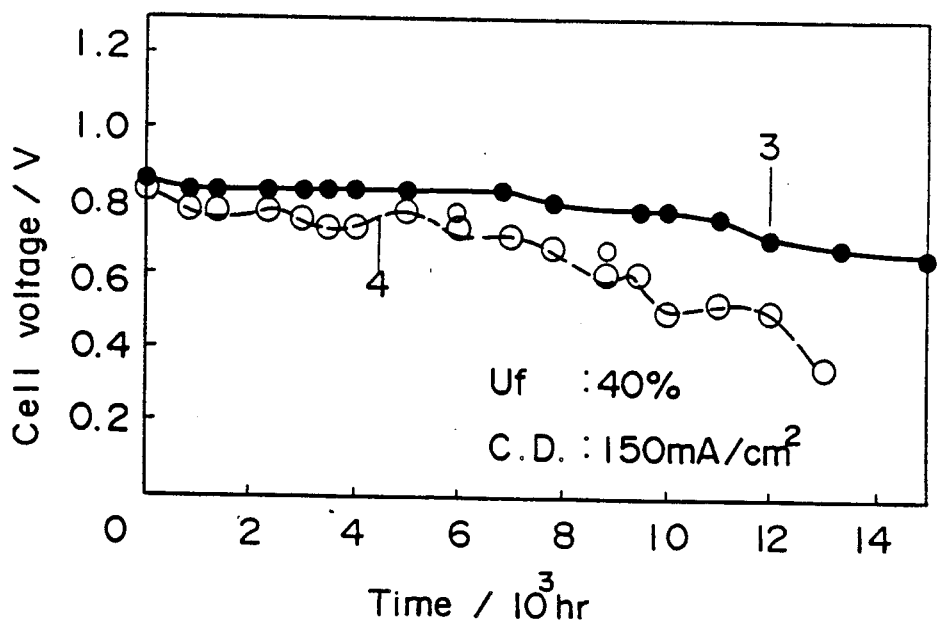

FIG. 4 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys were mixed to form the anode, a high performance was maintained for a long period, and the effectiveness was confirmed.

(Embodiment 4)

As the metal having a possibility of becoming metal hydrides or hydrogen absorbing alloys containing zirconium as a component, a zirconium-copper alloy was used. It may be used directly, but in this invention, its powder (15 μm or less) was electroless plated with nickel for improvement of corrosion resistance, and it was further coated with alumina powder for improving the wettability to the electrolyte, and it was sintered in a hydrogen atmosphere furnace at 750° C., and an anode was formed.

As the cathode, a lithium-doped porous nickel oxide was used, and the electrolyte was prepared by forming a mixture of lithium carbonate and potassium carbonate at 62:38 mol%, together with lithium aluminate which is an electrolyte retaining material, by the tape casting method. As the fuel gas, a mixture of hydrogen, carbon dioxide and steam at a ratio of 72:18:10 vol% was used, together with an oxidizer composed of air and carbon dioxide at a ratio of 70:30 vol%. The molten carbonate fuel cell was tested at a temperature of 650° C.

Figure 5:
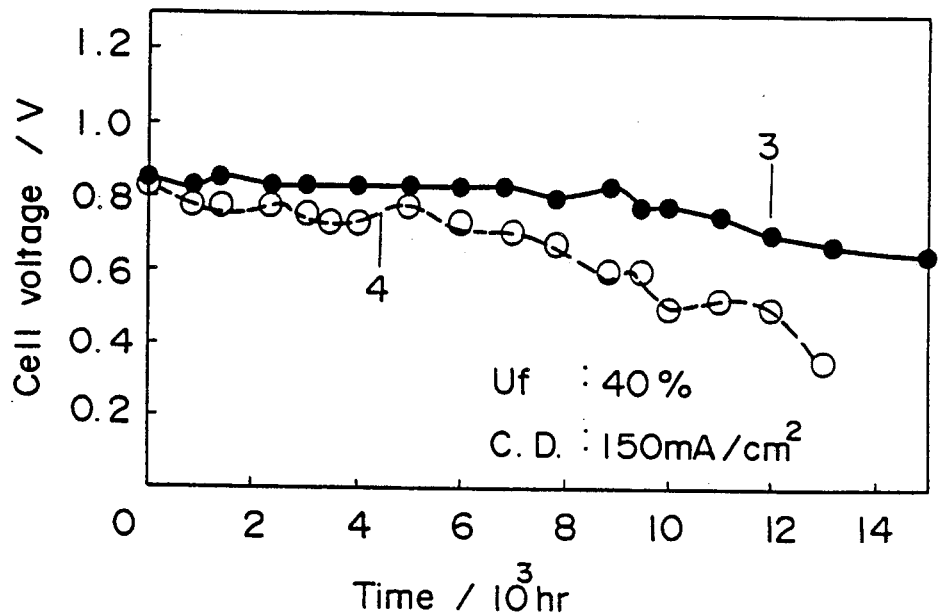

FIG. 5 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys were mixed to form the anode, a high performance was maintained for a long period, and the effectiveness was confirmed.

(Embodiment 5)

As the metal having a possibility of becoming metal hydrides or hydrogen absorbing alloys containing zirconium as a component, a zirconium-nickel alloy was used. It may be used directly, but in this embodiment, its powder (15 μm or less) was electroless plated with copper for improving the corrosion resistance, and was further mixed with traces (10 wt.%) of carbonyl-nickel powder as a sintering aid, and the mixture was sintered in a hydrogen atmosphere furnace at 900° C., and an anode was formed.

As the cathode, a lithium-doped porous nickel oxide was used, and the electrolyte was prepared by forming a mixture of lithium carbonate and potassium carbonate at 62:38 mol%, together with lithium aluminate which is an electrolyte retaining material, by tape casting method. As the fuel gas, a mixture of hydrogen, carbon dioxide and steam at a ratio of 72:18:10 vol% was used, together with an oxidizer composed of air and carbon dioxide at a ratio of 70:30 vol%. The molten carbonate fuel cell was tested at a temperature of 650° C.

Figure 6:
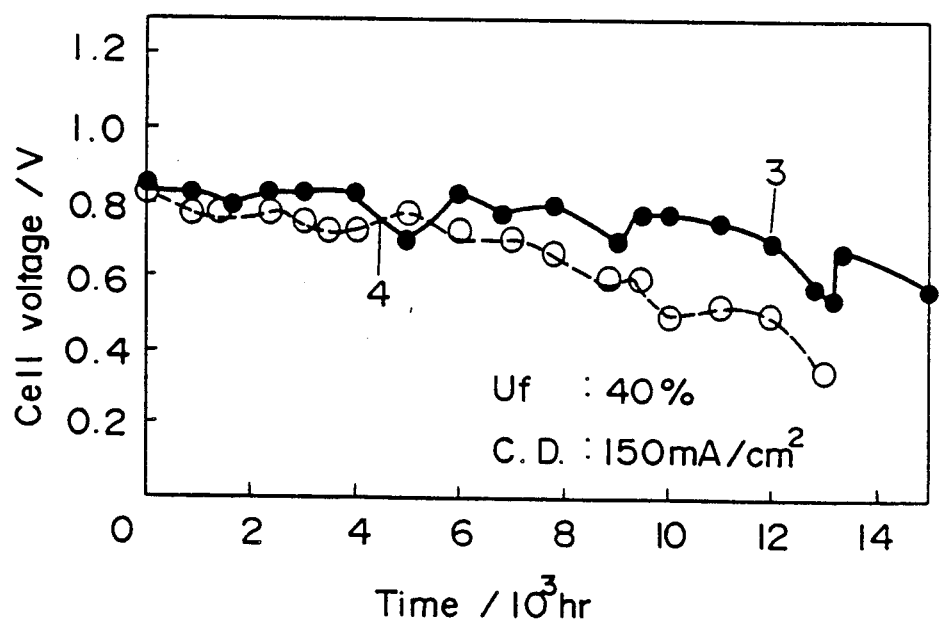

FIG. 6 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys were mixed to the anode, a high performance was maintained for a long period, and the effectiveness was confirmed.

(Embodiment 6)

As the metal hydrides or hydrogen absorbing alloys containing lanthanide elements, a mischmetal-nickel alloy was used. It may be used directly, but in this embodiment, its powder (15 μm or less) was electroless plated with copper for improving the corrosion resistance, and it was sintered in a hydrogen atmosphere furnace at 900° C., and an anode was formed.

As the cathode, a lithium-doped porous nickel oxide was used, and the electrolyte was prepared by forming a mixture of lithium carbonate and potassium carbonate at 62:38 mol%, together with lithium aluminate which is an electrolyte retaining material, by the tape casting method. As the fuel gas, a mixture of hydrogen, carbon dioxide and steam at a ratio of 72:18:10 vol% was used, together with an oxidizer composed of air and carbon dioxide at a ratio of 70:30 vol%. The molten carbonate fuel cell was tested at a temperature of 650° C.

Figure 7:
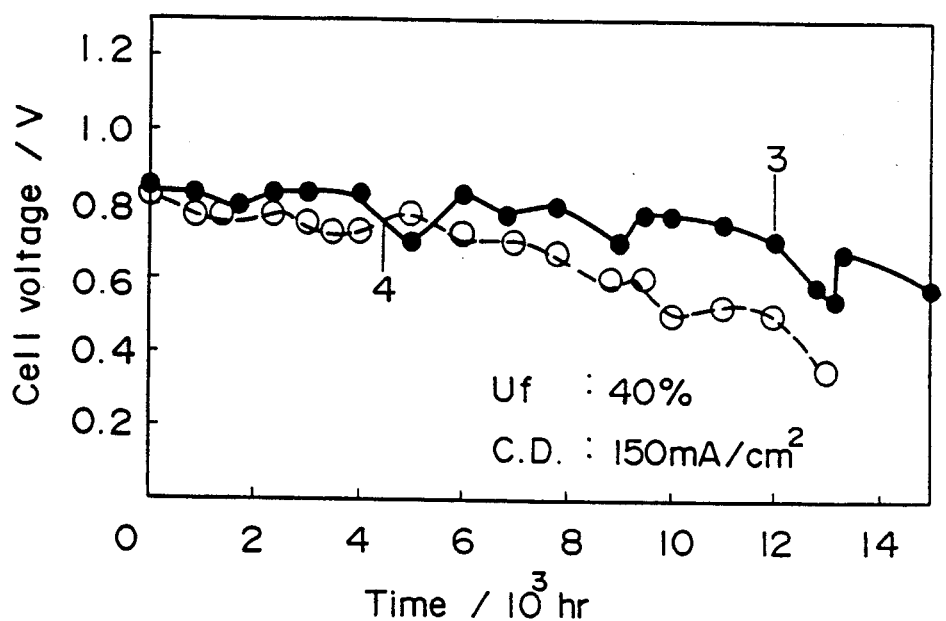

FIG. 7 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys was mixed to form the anode, a high performance was maintained for a long period, and the effectiveness was confirmed.

(Embodiment 7)

Of the metal hydrides or hydrogen absorbing alloys, as the eutectic crystal containing at least one element contained in hydrogen absorbing alloys or metal hydrides, together with hydrogen absorbing alloys or metal hydrides, an eutectic crystal of titanium-nickel alloy and nickel having 70 wt.% of nickel added to 30 wt.% of titanium, melting for a short time and crushing to 20 μm or smaller particle size was used. As a result of identification by X-ray diffraction, it was a eutectic crystal mainly composed of titanium-nickel alloy systems, nickel and traces of titanium. It was mixed with traces of carbonyl-nickel (10 wt.%) as a sintering aid, and the mixture was sintered in a hydrogen atmosphere furnace at 900° C., and an anode was formed.

As the cathode, lithium-doped porous nickel oxide was used, and as the electrolyte tile, 60 wt.% of carbonate was added to lithium aluminate which is an electrolyte support material (lithium carbonate: potassium carbonate=62:38 mol%), together with a forming aid, it was formed in a tile shape by tape casting method, and this tile form was heated to dissipate the forming aid, and the remainder was incorporated into the cell as the electrolyte tile. As the fuel gas, a mixture gas of hydrogen and carbon dioxide at a ratio of 80:20 was humidified at 60° C., and a mixture of air and carbon dioxide at a ratio of 70:30 was used as the oxidizer, and the characteristics of the molten carbonate fuel cell were tested at a temperature of 650° C.

Figure 8:
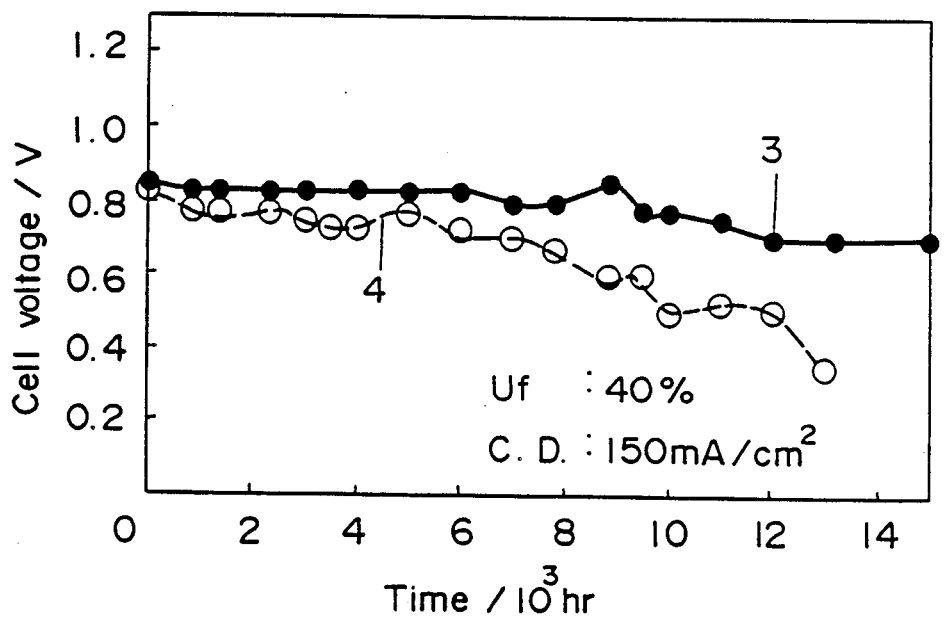

FIG. 8 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys were mixed to form the anode, a high performance was maintained for a long period, and the effectiveness was confirmed.

(Embodiment 8)

Of the metal hydrides or hydrogen absorbing alloys, as the eutectic crystal containing at least one element contained in hydrogen absorbing alloys or metal hydrides, together with hydrogen absorbing alloys or metal hydrides, 20 wt.% of copper and 20 wt.% of nickel were added to 60 wt.% of zirconium-copper alloy, and the mixture was melted for a short time, and was crushed to 20 μm or less to prepare a eutectic crystal of zirconium-copper alloy systems and nickel and copper. As a result of identification by X-ray diffraction, it was a eutectic crystal mainly composed of zirconium-copper alloy systems, copper, nickel, and traces of zirconium-nickel alloy systems. As a sintering aid, traces (10 wt.%) of carbonyl-nickel were mixed in, and the mixture was sintered in a hydrogen atmosphere furance at 850° C., and an anode was formed.

As the cathode, lithium-doped porous nickel oxide was used, and as the electrolyte tile, 60 wt.% of carbonate was added to lithium aluminate which is an electrolyte support material (lithium carbonate: potassium carbonate=62:38 mol%), together with a forming aid, it was formed in a tile shape by the tape casting method, and this tile form was heated to dissipate the forming aid, and the remainder was incorporated into the cell as the electrolyte tile. As the fuel gas, a mixture gas of hydrogen and carbon dioxide at a ratio of 80:20 was humidified at 60° C., and a mixture of air and carbon dioxide at a ratio of 70:30 was used as the oxidizer, and the characteristics of the molten carbonate fuel cell were tested at a temperature of 650° C.

Figure 9:
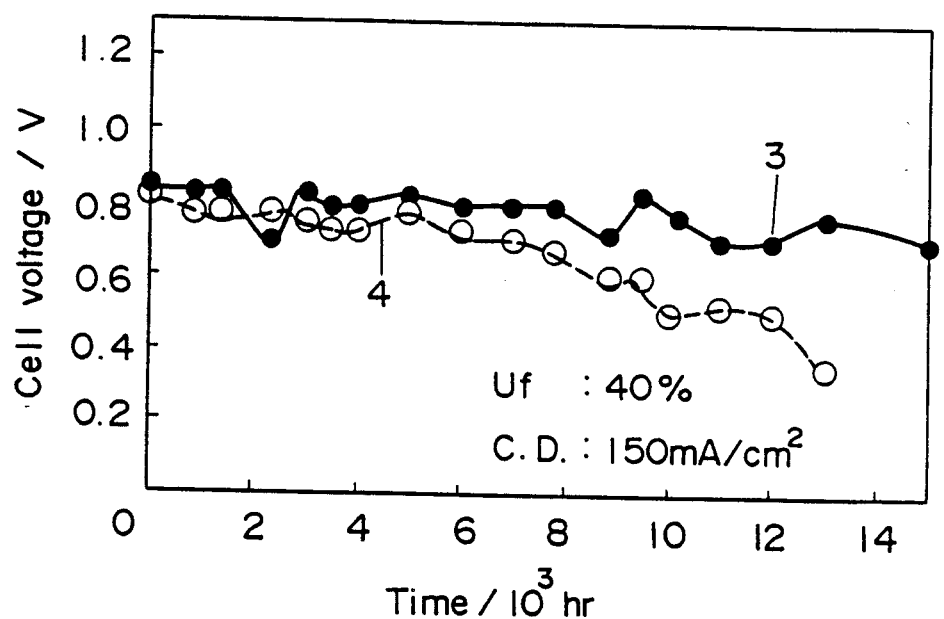

FIG. 9 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys was mixed to the anode, a high performance was maintained for a long period, and the effectiveness was confirmed.

(Embodiment 9)

Of metal hydrides or hydrogen absorbing alloys, as the eutectic crystal containing at least one element contained in hydrogen absorbing alloys or metal hydrides, together with hydrogen absorbing alloys or metal hydrides, 50 wt.% of nickel was added to 50 wt.% of zirconium-nickel alloy, and the mixture was melted for a short time, and was crushed to 15 μm or less to prepare an eutectic crystal of zirconium-nickel alloy systems and nickel. As a result of identification by X-ray diffraction, it was a eutectic crystal mainly composed of zirconium-nickel alloy systems and nickel. As a sintering aid, traces of carbonyl-nickel (10 wt.%) were added, and the mixture was sintered in a hydrogen atmosphere furnace at 900° C., and an anode was formed.

As the cathode, lithium-doped porous nickel oxide was used, and as the electrolyte tile, 60 wt.% of carbonate was added to lithium aluminate which is an electrolyte support material (lithium carbonate: potassium carbonate=62:38 mol%), together with a forming aid, it was formed in a tile shape by tape casting method, and this tile form was heated to dissipate the forming aid, and the remainder was incorporated into the cell as the electrolyte tile. As the fuel gas, a mixture gas of hydrogen and carbon dioxide at a ratio of 80:20 was humidified at 60° C., and a mixture of air and carbon dioxide at a ratio of 70:30 was used as the oxidizer, and the characteristics of the molten carbonate fuel cell were tested at a temperature of 650° C.

Figure 10:
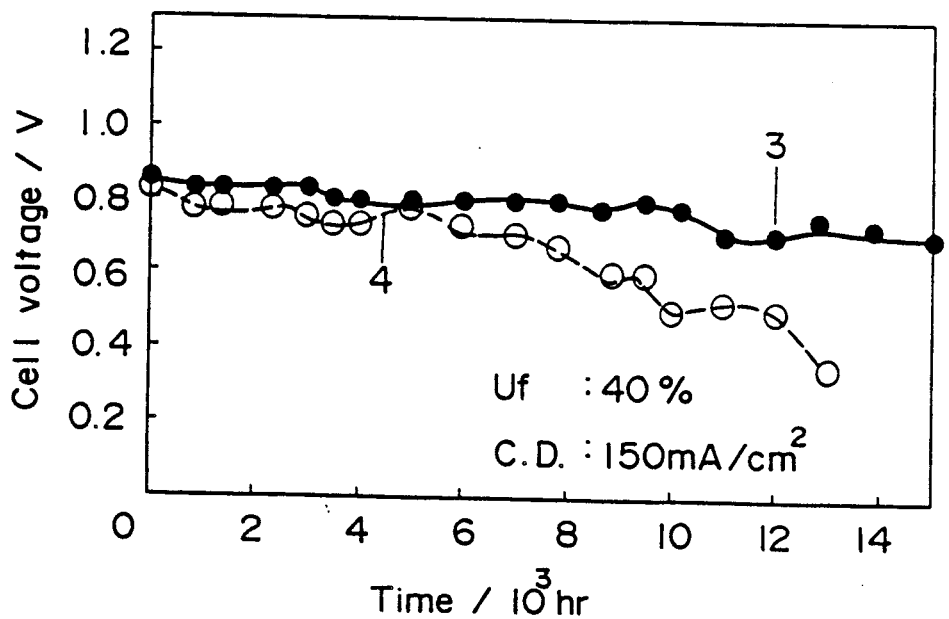

FIG. 10 shows the relation between the time and performance compared in the same condition between the cell having the metal hydrides or hydrogen absorbing metals mixed to the anode, and the cell using an ordinary nickel anode. Obviously, when the metal hydrides or hydrogen absorbing alloys were mixed to form the anode, a high performance was maintained for a long period, and the effectiveness was confirmed.

Thus, as presented in Embodiment 1 through 9, the superiority of this invention was evidently confirmed.

In the foregoing embodiments, as the method for preparing a eutectic crystal containing at least one element contained in hydrogen absorbing alloys or metal hydrides, together with hydrogen absorbing alloys or metal hydrides a method of melting hydrogen absorbing alloys or metal hydrides or a metal contained therein, and a metal containing at least one element included in hydrogen absorbing alloys or metal hydrides is disclosed, but this is not limitative, and any other method may be employed. Besides, as the substance for covering the surface of metal hydrides or hydrogen absorbing alloys, a metal containing nickel and copper, and ceramics containing aluminum are presented, but similar effects were obtained when coated with metal or ceramics containing at least one element of nickel, copper, aluminum, chromium, cobalt, palladium and platinum. Meanwhile, the carbonyl-nickel powder added as sintering aid may not be necessarily contained.

Only the applications of this invention into molten carbonate fuel cell were illustrated herein, but similar effects were obtained when applied in other high temperature fuel cells, such as solid electrolyte type fuel cells.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A fuel cell which operates at a high temperature, utilizing a gas comprising hydrogen as the fuel and a gas comprising oxygen as the oxidant, said cell comprising a negative electrode containing at least a metal hydride or a hydrogen-storing alloy, a porous positive electrode, and a non-aqueous electrolyte held between said negative and positive electrodes.

2. The fuel cell according to claim 1, wherein said metal hydride or hydrogen-storing alloy does not absorb hydrogen and becomes a metal which is permeable to hydrogen at the operating temperature of said fuel cell.

3. The fuel cell according to claim 1, wherein said metal hydride or hydrogen-storing alloy contains zirconium.

4. The fuel cell according to claim 1, wherein said metal hydride or hydrogen-storing alloy contains a rare-earth element.

5. The fuel cell according to claim 1 wherein said negative electrode is comprised of a eutectic composition containing a hydrogen-storing metal or metal hydride.

6. The fuel cell according to any one of claims 1 or 5 wherein said negative electrode comprises nickel or a nickel alloy.

7. The fuel cell according to claim 6 wherein said negative electrode comprises nickel.

8. The fuel cell according to any one of claims 1 to 5 wherein the surface of said metal hydride or hydrogen-storing alloy is coated with a metal or ceramic containing at least one of nickel, copper, aluminum, chromium, cobalt, palladium or platinum.

9. The fuel cell according to any one of claims 1 to 5 wherein said metal hydride or hydrogen-storing alloy is comprised of at last one of Zr-Ni, Zr-Cu, Ti-Ni, La-Ni, Mm-Ni, wherein Mm represents a mixture of rare-earth elements, or Ti-Ni metal systems.

10. The fuel cell according to any one of claims 1 to 5 wherein the electrolyte is comprised of a molten carbonate.

11. The fuel cell according to claim 1 wherein said negative electrode is comprised of a eutectic composition containing at least one element contained in a hydrogen-storing metal or metal hydride together with hydrogen absorbing metals or metal hydrides.

* * * * *